UNITED STATES PATENT OFFICE.

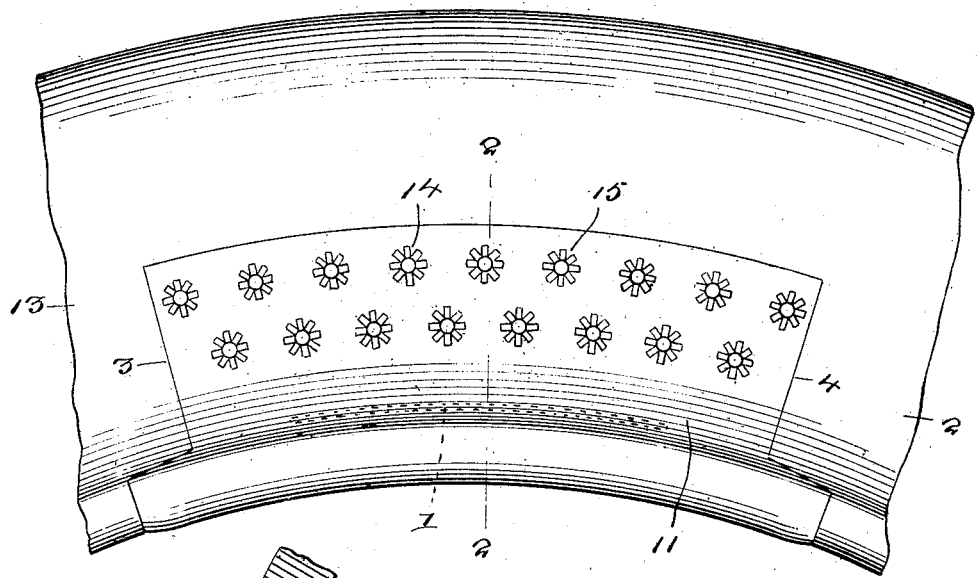
Fig. 1.
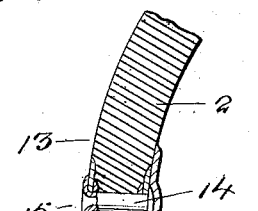
Fig. 2.
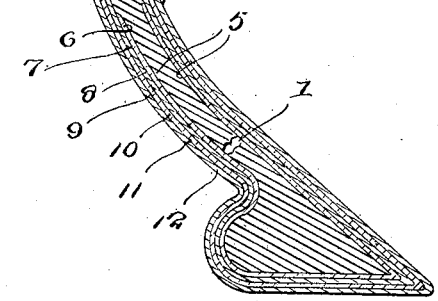
Inventor
F. D. Goodlake
By Victor J. Evans
Attorney

FREDERICK D. GOODLAKE, OF WEST PALM BEACH, FLORIDA.

REPAIRING TIRE-CASINGS.

1,374,846.  Specification of Letters Patent.  Patented Apr. 12, 1921.

Application filed April 25, 1919. Serial No. 292,537.

*To all whom it may concern:*

Be it known that I, FREDERICK D. GOODLAKE, a citizen of the United States, residing at West Palm Beach, in the county of Palm Beach and State of Florida, have invented new and useful Improvements in Repairing Tire-Casings, of which the following is a specification.

The object of my invention is the provision of simple and easily applied means for effectually repairing in a practical, durable and finished manner rim cuts in tire casings.

To the attainment of the foregoing, the invention consists in the improvement as hereinafter described and definitely claimed.

In the accompanying drawings, forming part hereof:—

Figure 1 is a side elevation showing a portion of a tire casing equipped with my novel means for repairing rim cuts.

Fig. 2 is an enlarged, transverse section taken in the plane indicated by the line 2—2 of Fig. 1 and showing my improvement in detail.

Similar numerals of reference designate corresponding parts in both views of the drawings.

My novel means for repairing rim cut casings is applicable to clencher or straight side casings, and if it be assumed that a casing side is cut to the extent indicated by the heavy dotted line 1 in Fig. 1, my improvement will be readily understood from the following detailed description:

I proceed first by cutting away the rubber layer 2 of the casing along the lines 3 and 4. I then apply para or other suitable cement to the side as indicated by 5 in Fig. 2, after which I apply to the side in straddling relation a layer 6 of strong textile material. This layer 6 is of less area than that described by the cuts 3 and 4 in about the proportion illustrated. I then apply a layer 7 of para or other suitable cement to the exposed side of the layer 6. Against the said cement layer 7 I arrange a layer 8 of strong textile material, this layer 8 being slightly larger in area than the layer 6 in about the proportion illustrated. To the exposed side of the layer 8 I apply a layer 9 of para or other suitable cement, and against said layer 9 I arrange a third layer 10 of strong textile material, which layer 10 is larger in area than the layer 9 in about the proportion illustrated. The layers of strong textile material are increased in area as they recede from the casing side, in order that the plurality of all textile layers will afford feather edges at the ends and side edges of the repair means. Any suitable number of textile layers may be embraced in the repair means in the discretion of the repair man, three layers 6, 8 and 10 being preferably employed in the larger and heavier casings. Over the outermost textile layer 10 I arrange a layer 11 of dry-tanned leather—*i. e.*, leather that is free from oil or grease, and I also interpose a layer 12 of para or other suitable cement between the layer 10 and the leather layer 11. The said leather layer 11 is arranged with its rough or flesh side inwardly, in order to assure secure holding of the layer by the cement as well as to enable the finished side of the leather layer to enhance the finished appearance of the repair when the same is completed. It will be readily apparent from Fig. 1 that the leather layer 11 is of an area to fully occupy the space formed in the rubber layer of the casing by the cuts 3 and 4; also, that a portion of the leather layer 11 is arranged flush with the surface of the rubber layer of the casing. After the application of all of the layers in the manner described, the said layers are connected together and to the casing side 13, Fig. 2, through the medium of a plurality of through and through transverse rivets 14, the heads 15 of which are arranged substantially flush with the exposed side of the leather layer 11 as illustrated. To complete the repair, I arrange at the inner side of the casing side 13 and in such manner as to cover the inner heads of all of the rivets 14, a layer 15 of soft textile or other fabric which is preferably, though not necessarily, secured by cement to the adjacent portion of the leather layer 11 and has for its function to prevent the inner heads of the rivets 14 from chafing the inner tube of the tire.

When effected in the manner described, my novel repair for a rim cut casing will last quite as long as the remainder of the casing, and hence will prolong the usefulness of the casing as a whole, which will be appreciated as a highly important advantage when the cost of tire casings, particularly large casings, is taken into consideration. It will also be manifest that my novel repair may be expeditiously and easily effected without resorting to vulcanization, and it does not detract in any measure from the finished appearance of the casing.

Having described my invention, what I claim and desire to secure by Letters-Patent, is:

A repaired rim-cut tire casing comprising the casing side portion from which an area of the outer rubber layer has been removed, a plurality of textile layers straddling said portion, interposed cement layers connecting said textile layers together and to the casing side portion; the inner textile layer being smaller in area than the cut removed portion in the casing side and the other textile layers being increased in area as they recede from the casing side portion to afford feather edges at the ends and side edges of the repair means, an outer leather layer straddling and cemented to the outer textile layer and arranged with its flesh side inwardly and its smooth side outwardly and also arranged flush with the surface of the outer rubber layer of the casing and fully occupying all of the space left by the said removal of a portion of said rubber layer, and rivets extending transversely through and joining the said casing side portion, the textile layers and the leather layer.

In testimony whereof I affix my signature.

FREDERICK D. GOODLAKE.